Nov. 8, 1927.  
E. G. GRIESE  
1,648,875  
DETACHABLE POWER UNIT FOR VEHICLES  
Filed Feb. 11, 1926    2 Sheets-Sheet 1

Inventor  
Elmer G. Griese  
By Owen & Owen  
Attorneys

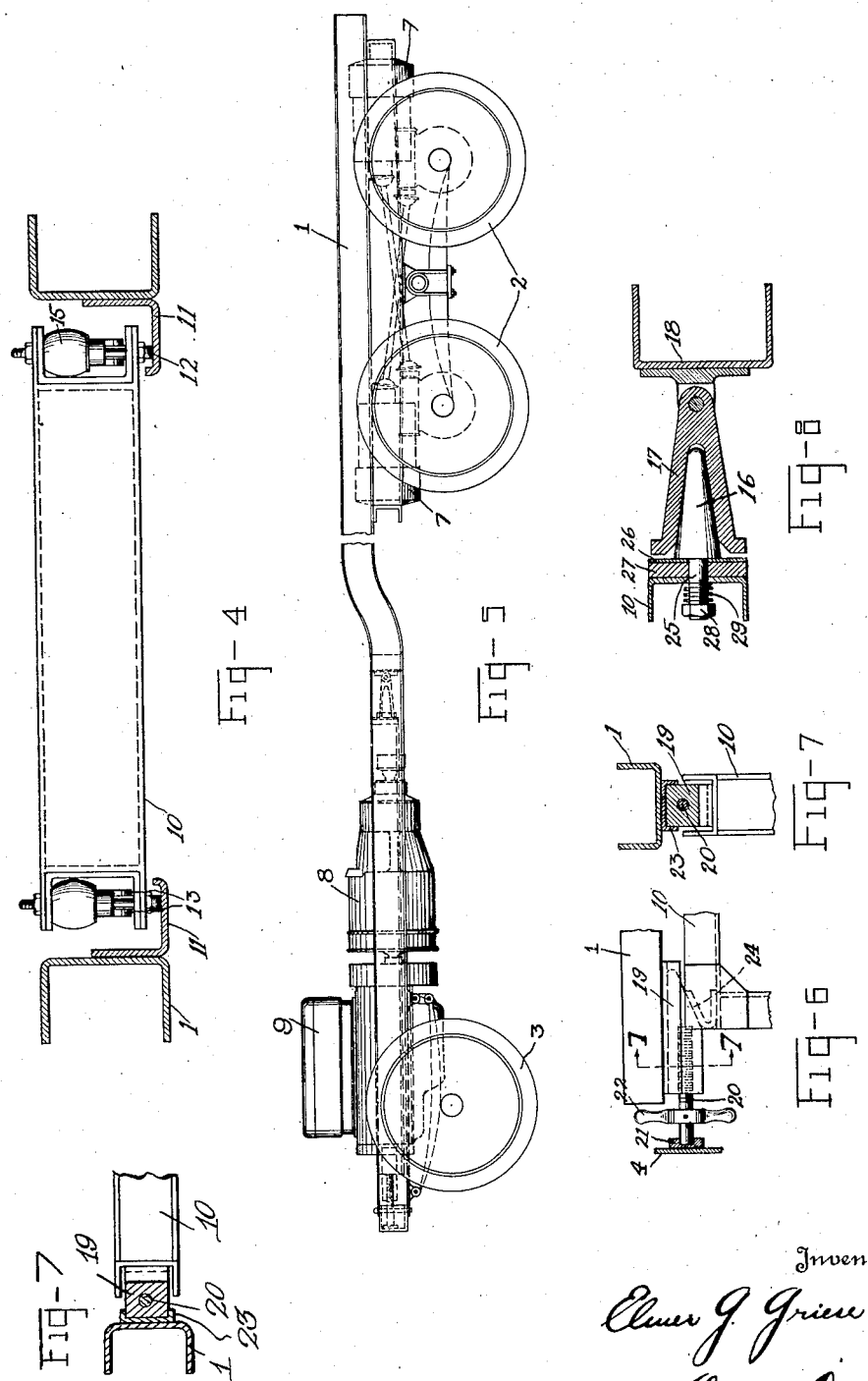

Patented Nov. 8, 1927.

1,648,875

UNITED STATES PATENT OFFICE.

ELMER G. GRIESE, OF TOLEDO, OHIO.

DETACHABLE POWER UNIT FOR VEHICLES.

Application filed February 11, 1926. Serial No. 87,528.

This invention relates to motor driven trucks or busses but more particularly to those types having detachable or removable power units so that a unit may be quickly and readily transferred from one vehicle to another.

Objects of this invention are to provide a removable power unit for a vehicle frame constructed in such a manner that the unit is compactly arranged and may be readily attached to or removed from the vehicle frame within a minimum period of time; to provide simple and efficient means for attaching the power unit to the vehicle frame to permit the unit to have limited universal movement relatively to the frame; and to provide an assembly having the unique features of arrangement, attachment and construction hereinafter described.

Figure 1:
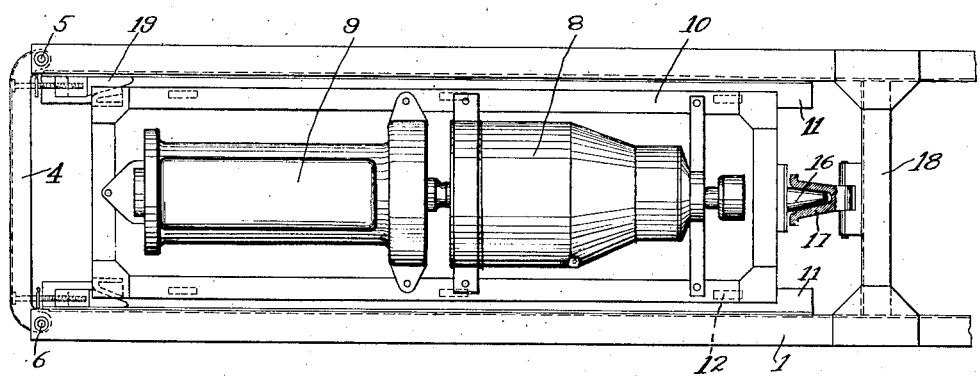
Figure 2:
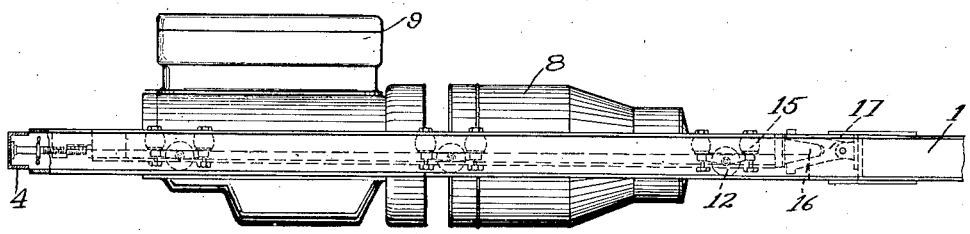
Figure 3:
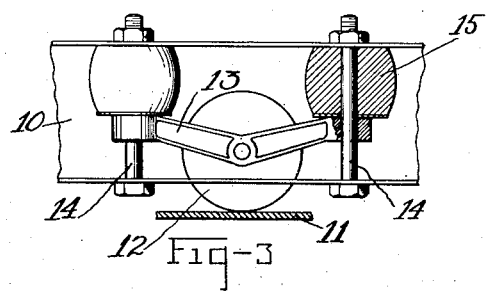

This invention is shown by way of illustration in the accompanying drawings, in which:

Fig. 1 is a top plan view of the forward end portion of the vehicle frame showing the power unit assembly attached thereto; Fig. 2 is a side elevation of the arrangement shown in Fig. 1; Fig. 3 is an enlarged detail showing the manner of attaching the rollers to the supplemental frame; Fig. 4 is a transverse section showing the manner of mounting the supplemental frame on the main frame; Fig. 5 is a side elevation of the chassis showing the front and rear ends; Fig. 6 is a detail sectional view showing the wedge adjustment for the forward end of the power unit assembly; Fig. 7 is a sectional view of the line 7—7 of Fig. 6; and Fig. 8 is a sectional view showing the manner of connecting the rear end of the power unit assembly to the main frame.

The illustrated embodiment of the invention comprises a main vehicle frame of channel iron supported by rear driving wheels 2 and front wheels 3 in any suitable manner. The front end of the frame 1 is provided with a cross bar 4 which is pivoted at 5 to one of the side bar members and the opposite end is held in place by a removable pin 6 so that removal of pin 6 permits the bar 4 to be swung outwardly for the purpose herein described.

The rear wheels 2 are driven by electric motors 7 through suitable connections and power is furnished to these motors from a generator 8 which is operated by gasoline engine 9. Inasmuch as the driving connections between the motor 7 and the drive wheels and the arrangement thereof forms no part of the present invention, further description thereof is deemed unnecessary.

The engine 9 and generator 8 are suitably fixed to a frame 10 thereby providing a unitary assembly. This assembly is removable from the main vehicle frame 1 so that in the event of the motor or generator needing repairs, inspection or overhauling, they may be removed as a unit from the vehicle frame and another unit substituted therefor. In this manner it will be apparent that the entire vehicle is not laid up when the engine or generator is disabled.

The frame 10 is supported on tracks 11 which are fixed to the inner side of the longitudinal side bars of the main frame 1. To permit the assembly to be readily rolled on and off the vehicle frame, sets of rollers 12 are mounted on the assembly frame 10, and as clearly illustrated in Figs. 3 and 4, each roller is mounted between substantially V-shaped arms 13, the ends of which slidably engage vertically disposed bolts 14 secured to the frame 10. Intermediate the upper ends of the arms 13 and the top of the channel frame and encircling the bolts 14 are resilient buffers 15 of rubber. As shown in Fig. 4 the above described parts lie within the channel of the frame 10 and the lower portion of the roller 12 extends through an opening in the lower channel part to engage the track 11. By so mounting the frame 10 it will be seen that the jars and shocks transmitted to the frame 10 by the main vehicle frame are taken up by the buffers 15 so as not to be transmitted to the working parts of the engine and generator.

Fixed to the rearward end of the frame is a rearwardly extending conical head 16 which is adapted to fit snugly into a socket member 17. As illustrated in Fig. 8 the conical head 16 is formed with a screw threaded extension 25 which extends through an opening in the channel frame 10 and positioned between the frame and the conical head 16 is a washer member 26 and resilient rubber buffer 27. Engaging the end of the screw threaded extension 25 is a nut 28 and a spring 29 is positioned between the nut 28 and channel frame 10. It will thus be seen that the head 16 is yieldably connected to the frame so as to compensate for the jars and shocks imparted by the main frame.

The socket member 17 is suitably hinged to a channel bar 18 which is secured at its opposite ends to the vehicle frame 1. By these connections the assembly frame 10 is permitted to move in a limited manner relatively to the vehicle frame 1, so that it may be said that the assembly is resiliently or flexibly supported by the main frame 1.

The forward end of the assembly frame 10 is held in place by means of wedges 19 which are engaged by a screw 20 whose outer end rests in a cup 21. A hand wheel 22 on the screw 20 enables the screw to be rotated in one direction or the other for moving the wedge 19 inwardly or outwardly relatively to the frame 10. As indicated in Fig. 1 a pair of wedge members 19 are employed on opposite sides of the vehicle member 1. The movement of these members 19 is guided by a channel member 23 fixed to the inner side of the frame 1 and the inner end of the wedge engages a complemental wedge member or inclined surface 24 on the assembly frame 10.

It will be seen that by rotating the hand wheels 22 to force the wedge members 19 into engagement with the inclined surfaces 24 on the assembly frame 10, the conical member 16 on the rear end of the frame 10 is forced into engagement with the socket member 17, thereby holding the rear end in place, the forward end being held in place by the wedges as will readily be understood. It is apparent that these several connections between the assembly frame 10 and main frame 1 are not for the purpose of rigidly holding the assembly frame in position but merely to hold it in place and permit slight movement between the two frames.

Among the advantages of the detachable power unit is that this unit may be inspected periodically or repaired without tying up the entire investment or removing the truck from service. This results in an enormous saving, because each day the truck is out of use a great amount of money is necessarily lost. By this invention the loss need not be incurred because, when one unit needs inspection or repair, another unit may be readily and quickly substituted. Furthermore, these units are not individual to any particular truck but may be mounted on any suitable frame. This permits their use advantageously in connection with a fleet of trucks so that the upkeep cost of an individual unit may be considered independently of the body. It is well known that the power unit needs far more attention than any other part of the vehicle and by providing a unitary assembly, as hereinbefore described, the power unit may be repaired or inspected without throwing out of use the rest of the vehicle. The relative expense of engine trouble involved in a truck having a detachable power unit and the ordinary truck will be evident, because in the latter the load is tied up, the truck must be hauled to a garage, or the load must be transferred to another truck, but with the detachable power unit, the disabled engine can be replaced by another and the truck is ready to proceed. A further feature resides in the fact that the power of the truck may be varied in accordance with the work to be done, because a unit having greater or less power may be substituted for the one mounted on the truck. Another advantage is that there is perfect alignment maintained between the generator and engine because of the rigid frame and unitary assembly.

While the form of mechanism here shown and described is admirably adapted to fulfill the objects primarily stated, it is to be understood that it is not intended to confine the invention to the one form of embodiment herein disclosed, and it is susceptible of embodiment in various forms all coming within the scope of the claims which follow.

What I claim as new and desire to secure by Letters Patent is:

1. In a vehicle, the combination of a main frame, a track on said main frame, a supplemental frame, a power unit fixed to said supplemental frame, means for detachably connecting said frames, antifriction means for said supplemental frame for enabling said supplemental frame to be readily removed from said main frame, and resilient means associated with said antifriction means to permit yielding movement of said supplemental frame relatively to said main frame.

2. In a vehicle, the combination of a main frame, a carriage frame, means for detachably connecting said carriage frame to said main frame at three points, two of said points being arranged in relatively close juxtaposed relation, and the other point being remote therefrom, antifriction means for permitting said carriage frame to be readily withdrawn from said frame, and resilient means associated with said antifriction means to permit yielding movement of said supplemental frame relatively to said main frame.

3. In a vehicle, the combination of a main frame, a carriage frame mounted on said main frame, wedge means for connecting one end portion of said carriage frame to said main frame, and a separable hinge connection between the opposed end portion of said carriage frame and the main frame.

4. In a vehicle, the combination of a main frame, a carriage frame mounted on said main frame, adjustable wedge means for attaching one end portion of said carriage frame to said main frame, a conical head on the opposite end portion of said carriage frame, and socket means carried by the main frame for receiving said head.

5. In a vehicle, the combination of a main frame, a carriage frame mounted on said main frame, a separable cross bar for one end portion of said main frame, wedge means engageable with said carriage frame for holding the latter in position, adjusting means for said wedge means engageable with said cross bar whereby removal of said cross bar permits removal of said wedge means, a conical head on the opposite end of said carriage frame, a socket member engageable with said head, and means for pivoting said head to said main frame.

In testimony whereof I have hereunto signed my name to this specification.

ELMER G. GRIESE.